United States Patent
Campbell

(10) Patent No.: US 7,388,810 B2
(45) Date of Patent: Jun. 17, 2008

(54) ULTRASONIC DISTANCE MEASUREMENT SYSTEM

(75) Inventor: Lawrence Alexander Campbell, Woolwich (AU)

(73) Assignee: Viren Pty Limited, New South Wales (AU)

(*) Notice: Subject to any disclaimer, the term of this patent is extended or adjusted under 35 U.S.C. 154(b) by 109 days.

(21) Appl. No.: 11/340,269

(22) Filed: Jan. 25, 2006

(65) Prior Publication Data
US 2006/0215492 A1 Sep. 28, 2006

(30) Foreign Application Priority Data
Mar. 23, 2005 (AU) ............................... 2005901465

(51) Int. Cl.
*G01S 15/08* (2006.01)
(52) U.S. Cl. .................... 367/99; 367/901; 367/908
(58) Field of Classification Search .................. 367/99, 367/176, 908, 123, 125, 901
See application file for complete search history.

(56) References Cited

U.S. PATENT DOCUMENTS 4,528,652 A * 7/1985 Horner et al. .............. 367/176
5,515,341 A * 5/1996 Toda et al. .................. 367/908
5,959,456 A * 9/1999 Whorlow et al. ........... 324/662
2004/0118210 A1* 6/2004 Tooma et al. ................. 73/625

FOREIGN PATENT DOCUMENTS

JP 2000-221019 11/2000
WO WO 89/02086 9/1989

OTHER PUBLICATIONS

International Type Search Report (Australian Patent Office).

* cited by examiner

*Primary Examiner*—Ian J Lobo
(74) *Attorney, Agent, or Firm*—Abelman, Frayne & Schwab

(57) ABSTRACT

A system for measuring distance in a gas or liquid operating medium has an even number of ultrasonic signal transmitters (12, 14), and a single ultrasonic signal receiver (16). The ultrasonic signal transmitters are adapted to transmit ultrasonic signals to a target (18) in the operating medium. Each of the transmitters and receiver are so spaced apart in a geometrically symmetrical planar array within an acoustically attenuating substrate medium, and each of the transmitted ultrasonic signals are so pulse driven in an acoustically symmetrical relationship, that opposing ultrasonic signals transmitted through the substrate medium by symmetrically opposed transmitters are cancelled at the receiver and a signal for measuring distance to the target is formed at the receiver by combination of the transmitted signals through the operating medium.

4 Claims, 9 Drawing Sheets

Cross Talk Cancellation in an Acoustically Symmetrical System

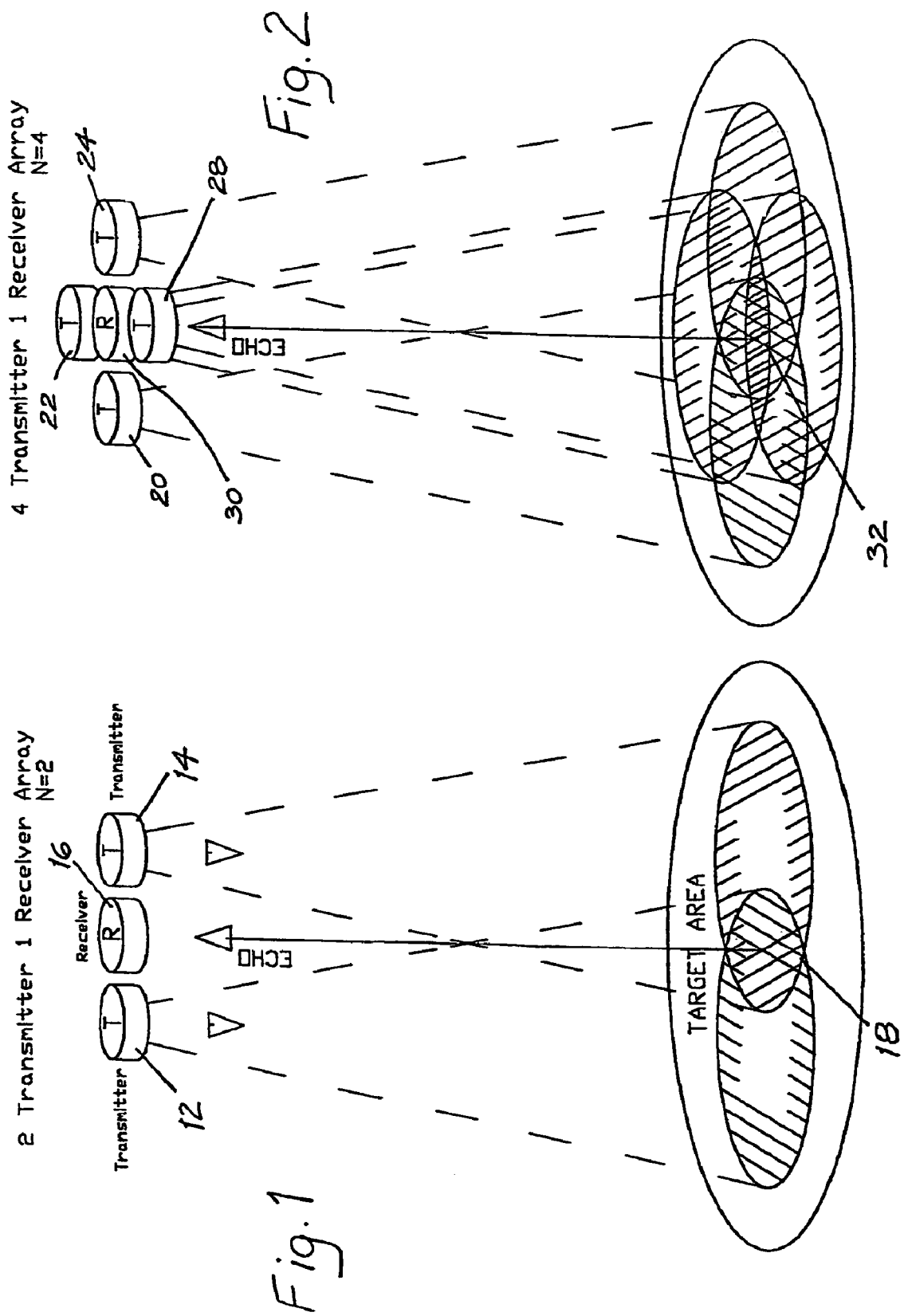

Cross Talk Cancellation in an Acoustically Symmetrical System

Cross Talk Cancellation in an Acoustically Asymmetrical System

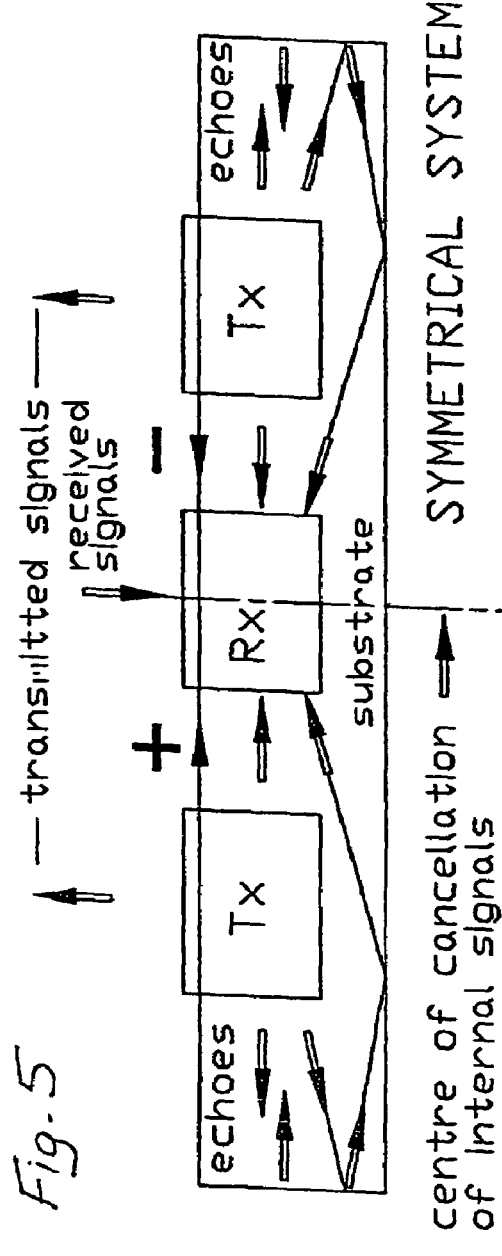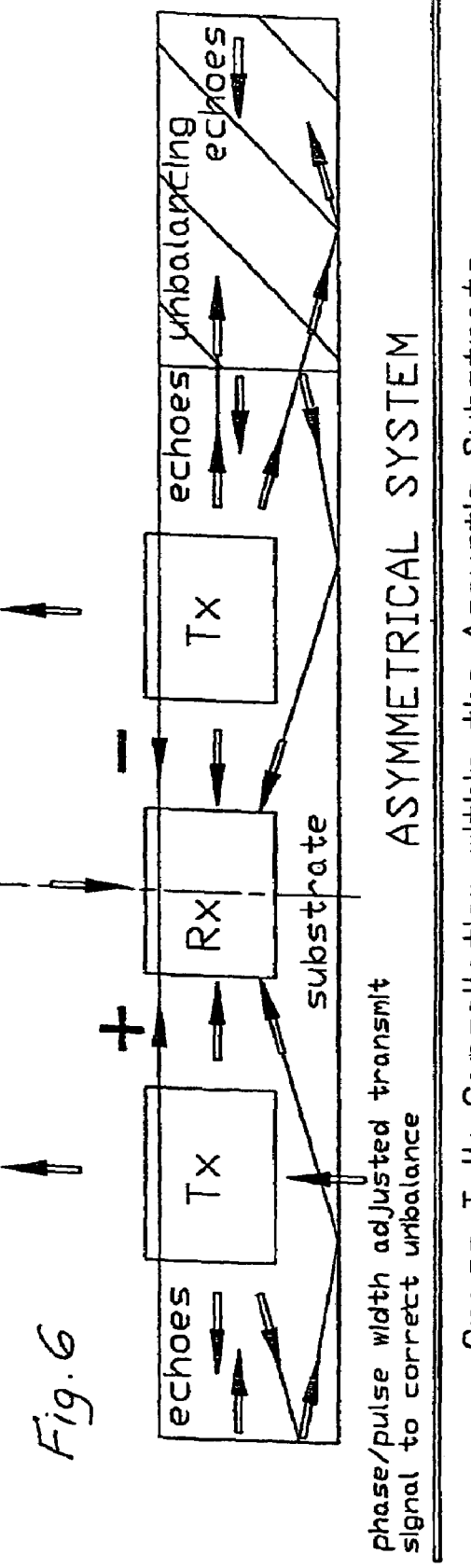

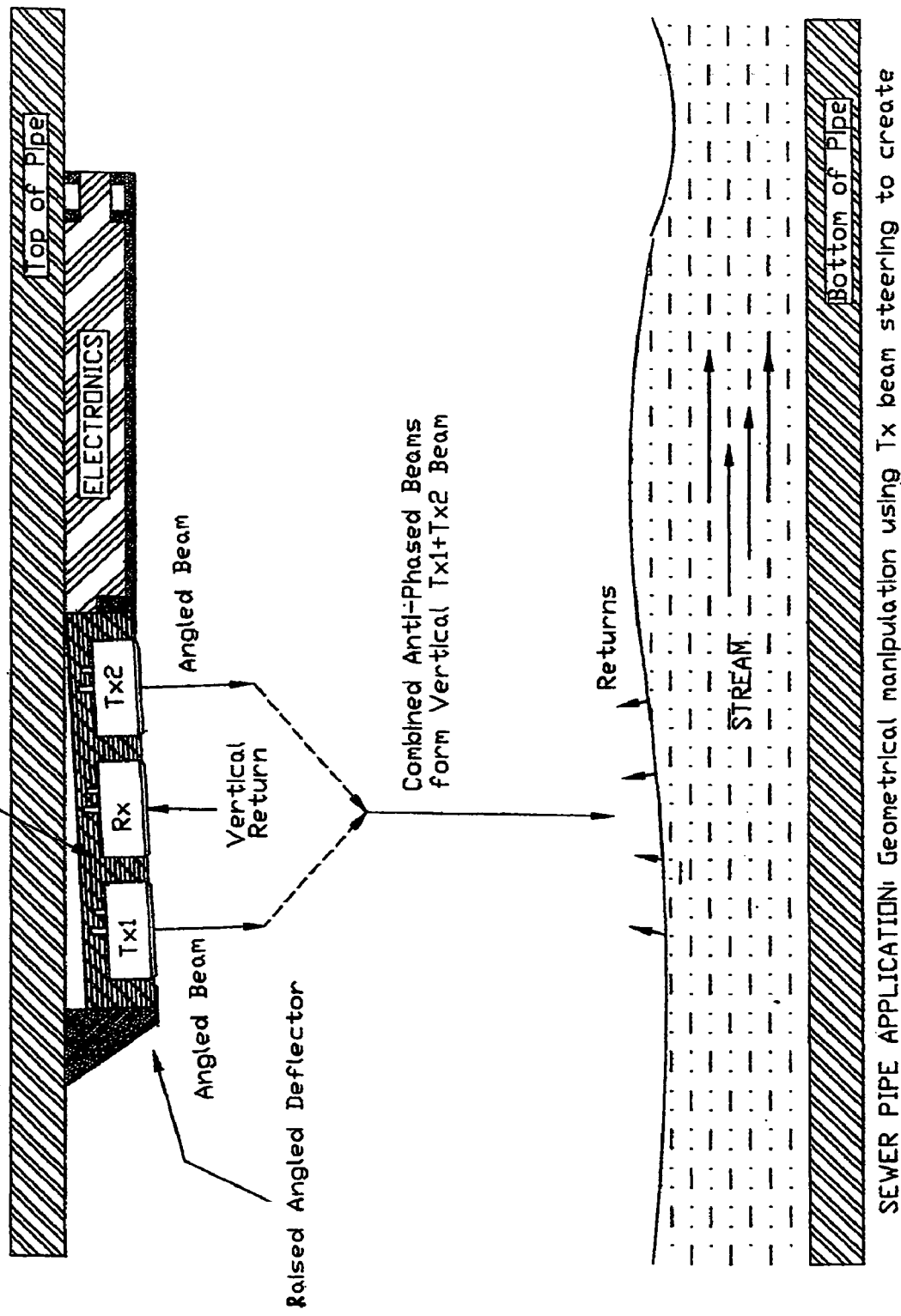

ULTRASONIC DISTANCE MEASUREMENT SYSTEM

FIELD OF THE INVENTION

The present invention relates to ultrasonic distance measurement and, in particular, to a system for measuring distance in a gas or liquid operating medium which employs a plurality of ultrasonic signal transmitters and a single ultrasonic signal receiver so geometrically configured and pulse driven as to substantially eliminate cross-talk between the transmitters and receiver.

The system is particularly suited for operation in harsh conditions, for example, for measurement of depth in sewer pipes, the system being constrained in choice of materials and implementation by the desire for waterproofing and shedding of debris and fouling materials that are frequently present in sewer pipes.

DESCRIPTION OF THE BACKGROUND ART

The principal technique employed in ultrasonic distance measurement in an air or water operating medium is to transmit a burst of ultrasonic energy into the operating medium and measure the elapsed time between the time of transmission and the time of receipt of an echo from a distant target. With the knowledge of the speed of sound in the operating medium and the time taken to travel from the transmitter to the target and back to the receiver, the distance to the target can be calculated.

A typical measuring system of this type consists of one or more electroacoustic transmitting transducers and one closely located receiving transducer. The transducers are commonly piezoelectric devices which are pulse driven and tuned to exhibit a sharp resonant frequency within the range of 20 KHz to 400 KHz in air and up to several MHz in liquids. The choice of frequency depends on the required maximum range, accuracy and finest resolution.

The simplest configuration which is commonly employed consists of a single piezoelectric transducer performing the dual function of transmitter and receiver. However, this arrangement suffers from a major disadvantage in that short range measurements are impossible without complex (and often unreliable) signal processing. The reason for this is that a short electrical transmitter driving pulse causes a much longer ringing burst of ultrasonic energy, thereby limiting the receipt of the echo signal until the ringing decays.

A means of overcoming the above described disadvantage is to separate the transmitter and receiver so that they are completely acoustically isolated from one another. This approach is most successful when there is wide spacing between transmitter and receiver, but such wide spacing introduces other disadvantages inherent in having large dimension apparatus.

In many applications requiring compactness, there is a necessary requirement for the transmitting and receiving transducers to be closely spaced and to share the same substrate medium. Sufficient isolation between such closely spaced transmitter and receiver is difficult to achieve even when sharing a substrate medium of acoustic insulating material. Direct transmission through the operating medium, surface waves across the substrate medium, and transmission of internal spurious ultrasonic signals through the substrate medium also make it impossible to provide the desired acoustic isolation between transmitter and receiver. This interference between transmitter and receiver is commonly termed "cross-talk".

Cross-talk becomes a serious problem in the measurement of short distances when the echo signal is received before the natural oscillation of the pulse driven transmitter has time to decay and transmits through the substrate medium to distort or swamp the received echo signal. The result is to limit the capability of short distance measurement. This effect is called "dead band". In performance specifications of this type of distance measuring device, a small dead band is extremely important.

Furthermore, the choice of waterproof piezoelectric transducers to withstand a harsh environment, say, in sewer pipes has limited the prior art systems to use of particular waterproof cylindrically shaped devices with a piezoelectric transducing diaphragm on one end and a sealed back face. The inertia of a vibrating diaphragm of the transmitting transducer is sufficient to cause spurious ultrasonic signals from the side and back faces. Conversely, the side and back faces of the receiving transducer become sensitive to the spurious ultrasonic signals through the substrate medium. This increases the cross-talk effect.

Encapsulation of the transmitting and receiving transducers in an acoustically attenuating substrate medium provides a significant reduction in cross-talk. However, sufficient isolation between transmitter and receiver is still difficult to achieve in compact configurations.

The problem of cross-talk is further complicated in systems employing a plurality of transmitters in an array surrounding a single receiver. Whilst the multiplicity of transmitters provides the advantage of cooperating to form a narrower beam angle, and therefore improved directivity, the problem of cross-talk remains.

It is an objective of the invention to provide an arrayed system encapsulated in an acoustically attenuating substrate medium that can be geometrically configured and driven with phased transmission pulses to substantially eliminate cross-talk and so substantially reduce dead band.

SUMMARY OF THE INVENTION

According to the invention, there is provided a system for measuring distance in a gas or liquid operating medium, comprising an even number of ultrasonic signal transmitters, and a single ultrasonic signal receiver, the ultrasonic signal transmitters being adapted to transmit ultrasonic signals to a target in the operating medium, wherein each of the transmitters and receiver are so spaced apart in a geometrically symmetrical planar array within an acoustically attenuating substrate medium and wherein each of the transmitted ultrasonic signals are so pulse driven in an acoustically symmetrical relationship that opposing ultrasonic signals transmitted through the substrate medium by symmetrically opposed transmitters are cancelled at the receiver and a signal for measuring distance to the target is formed at the receiver by combination of the transmitted signals through the operating medium.

Preferably, the transmitters are electroacoustic transmitting piezoelectric transducers and the receiver is an electroacoustic receiving piezoelectric transducer.

According to another aspect of the invention, there is provided a process for substantially eliminating cross-talk and so substantially reducing dead band in an ultrasonic distance measurement system, comprising:

(i) spacing apart an even number of ultrasonic signal transmitters and a single ultrasonic signal receiver in a geometrically symmetrical planar array within an acoustically attenuating substrate medium, (ii) causing the transmitters to transmit ultrasonic signals to a target in an operating medium, the ultrasonic signals being so pulse driven in an acoustically symmetrical relationship that opposing ultrasonic signals transmitted through the substrate medium by symmetrically opposed transmitters are cancelled at the receiver, and a signal for measuring distance to the target is formed at the receiver by combination of the transmitted signals through the operating medium.

BRIEF DESCRIPTION OF THE DRAWINGS

FIG. 1 is a schematic diagram of a preferred distance measuring system of the invention employing a geometrically symmetrical planar array of two transmitters and one receiver to measure distance to a target through a gas or liquid medium.

FIG. 2 is a schematic diagram of another preferred distance measuring system of the invention employing a geometrically symmetrical planar array of four transmitters and one receiver to measure distance to a target through a gas or liquid medium.

FIG. 5 is a schematic diagram showing another example of the system of FIG. 3, wherein there is shown subtraction of cross-talk signals and addition of signals transmitted into the medium.

FIG. 6 is a schematic diagram showing another example of the system of FIG. 4, wherein there is shown subtraction of cross-talk signals and addition of signals transmitted into the medium.

FIG. 11 is a schematic diagram of another preferred distance measuring system of the invention employing a geometrically symmetrical, but tilted, planar array of two transmitters and one receiver both to measure distance to a target in a liquid stream, and to protect the transmitters and receiver against impact by floating debris during surge conditions.

DETAILED DESCRIPTION OF THE PREFERRED EMBODIMENTS

Figure 3:
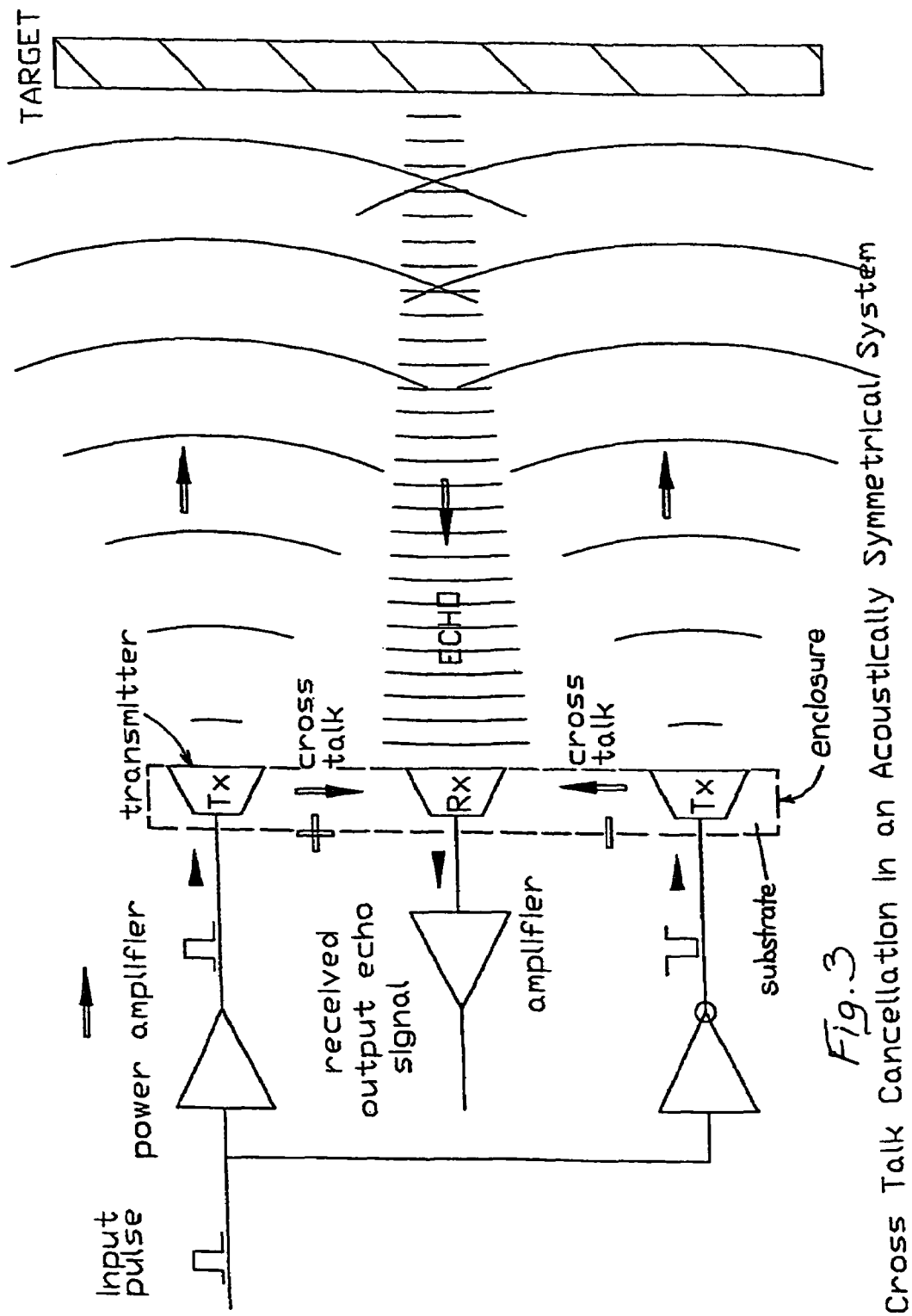
FIG. 3 is a schematic diagram showing how cross-talk is substantially eliminated in the system of FIG. 1 where the transmitted ultrasonic signals are pulse driven in an acoustically symmetrical phased relationship.

The system shown schematically in FIG. 1 measures distance within an enclosure containing a gas or liquid medium by use of a geometrically symmetrical planar array of two transmitters 12, 14 and one receiver 16 to a target area 18 (shown in shading).

Each transmitter, which is an electroacoustic transmitting piezoelectric transducer, is driven by a separate pulse source so that the total ultrasonic signal transmitted into the gas or liquid operating medium is a combination of sequential pulses which form the overall transmitted signal (i.e. for an N transmitter configuration, N pulses form the overall signal transmitted into the medium).

The system shown schematically in FIG. 2 has a geometrically symmetrical planar array of four transmitters 20, 22, 24, 28 (i.e. for N=4) and one centrally located receiver 30, and measures distance through the medium to a target area 32 within an enclosure.

In FIGS. 3 and 5, ultrasonic signal cancellation is achieved in an acoustically symmetrical N=2 system. The short duration input pulse feeds two power amplifiers, one of which inverts the output signal. The opposing signals drive their respective transmitter, causing opposing cross-talk signals within the acoustically attenuating substrate medium to meet and cancel at the centre where the receiver is located by virtue of the symmetrical internal acoustic environment of the substrate medium surrounding the receiver, whilst the signals transmitted into the operating medium are reflected at the target area and combine as one received signal at the receiver, in the form of a short and powerful distance measuring signal.

Practical limitations will often allow symmetry to be achieved within the operating medium but prevent symmetry being achieved within the acoustically attenuating substrate medium. For example, the need to encapsulate electronic components in the substrate medium can unbalance the ultrasonic signal transmission paths through the substrate medium. Correction can be achieved by adjusting the phasing of the opposing transmitting pulses. Slight adjustment of the duration of one of the pulses can correct for unbalanced attenuation in opposing acoustic paths.

Figure 4:
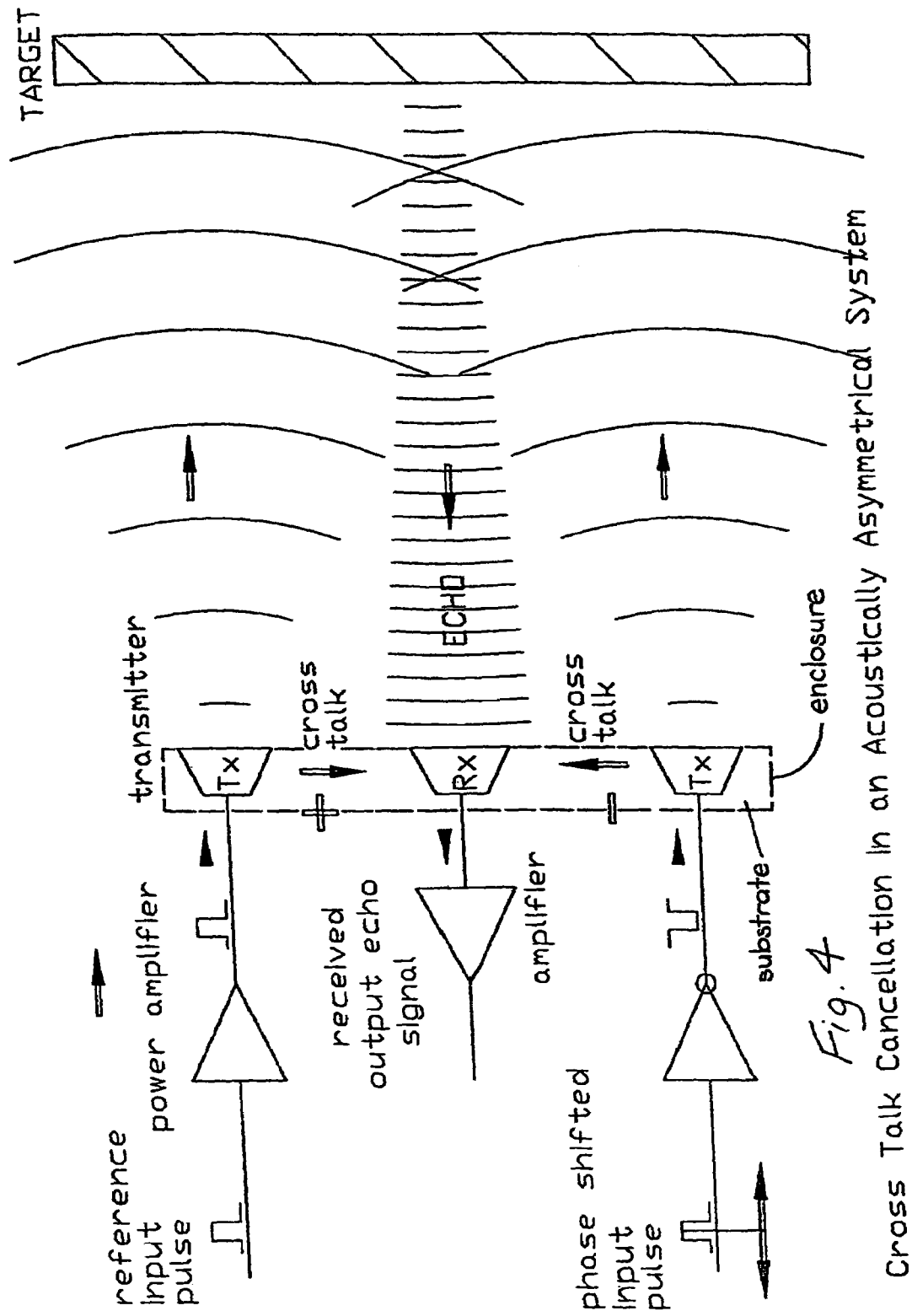
FIG. 4 is a schematic diagram showing how cross-talk is substantially eliminated in the system of FIG. 1 where the transmitted ultrasonic signals are pulse driven in an acoustically asymmetrical phased relationship.

In FIGS. 4 and 6, ultrasonic signal cancellation is achieved in an acoustically asymmetrical N=2 system. One of the square wave driving pulses is adjusted in its duration and phase relationship with the transmission frequency so that the complex spurious transmitted and reflected signals within the substrate medium are substantially cancelled at the receiver.

Maximum effect is achieved in design of the internal acoustic environment by accurate positioning and spacing of transmitting and receiving transducers, choice of substrate material and careful design of the enclosure with respect to material, internal reflecting surfaces and isolation of ultrasonic surface waves.

Graphical records of received signals in a 40 KHz, N=2 system are shown in FIGS. 7 to 10 when measuring distance in an operating medium of air.

Figure 7:
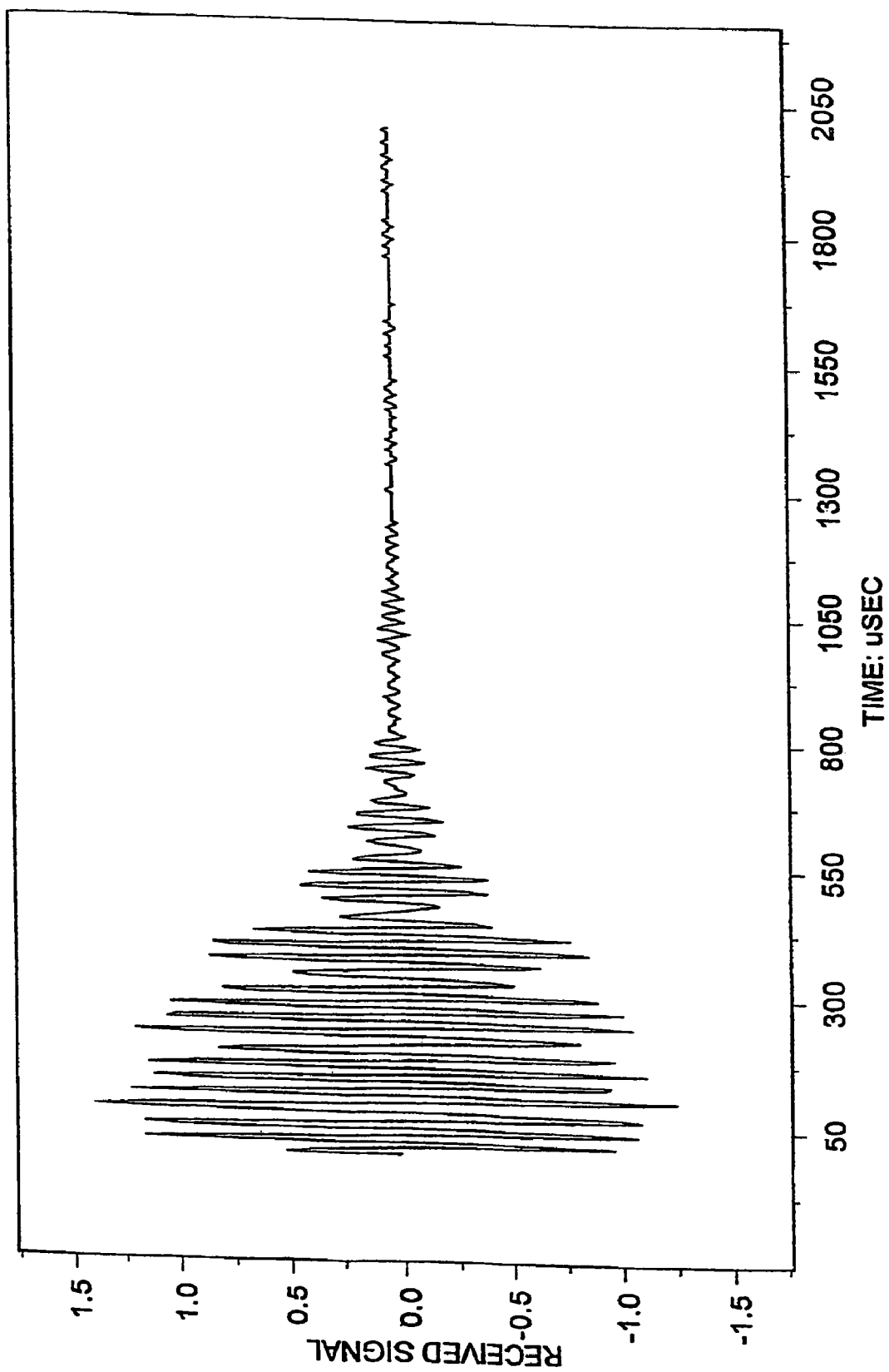
FIGS. 7 & 9 are graphs showing the presence and effect of cross-talk on an ultrasonic signal received in a geometrically symmetrical planar array of transmitters and receiver, and in which the transmitters are pulse driven in phase.

FIG. 7 shows the ringing signal received when two transmitters are in phase. Cross-talk is not cancelled before receiving an echo. It shows that considerable interference occurs in the first 600 microseconds of transmission. This would cause a dead band of 100 mm.

Figure 8:
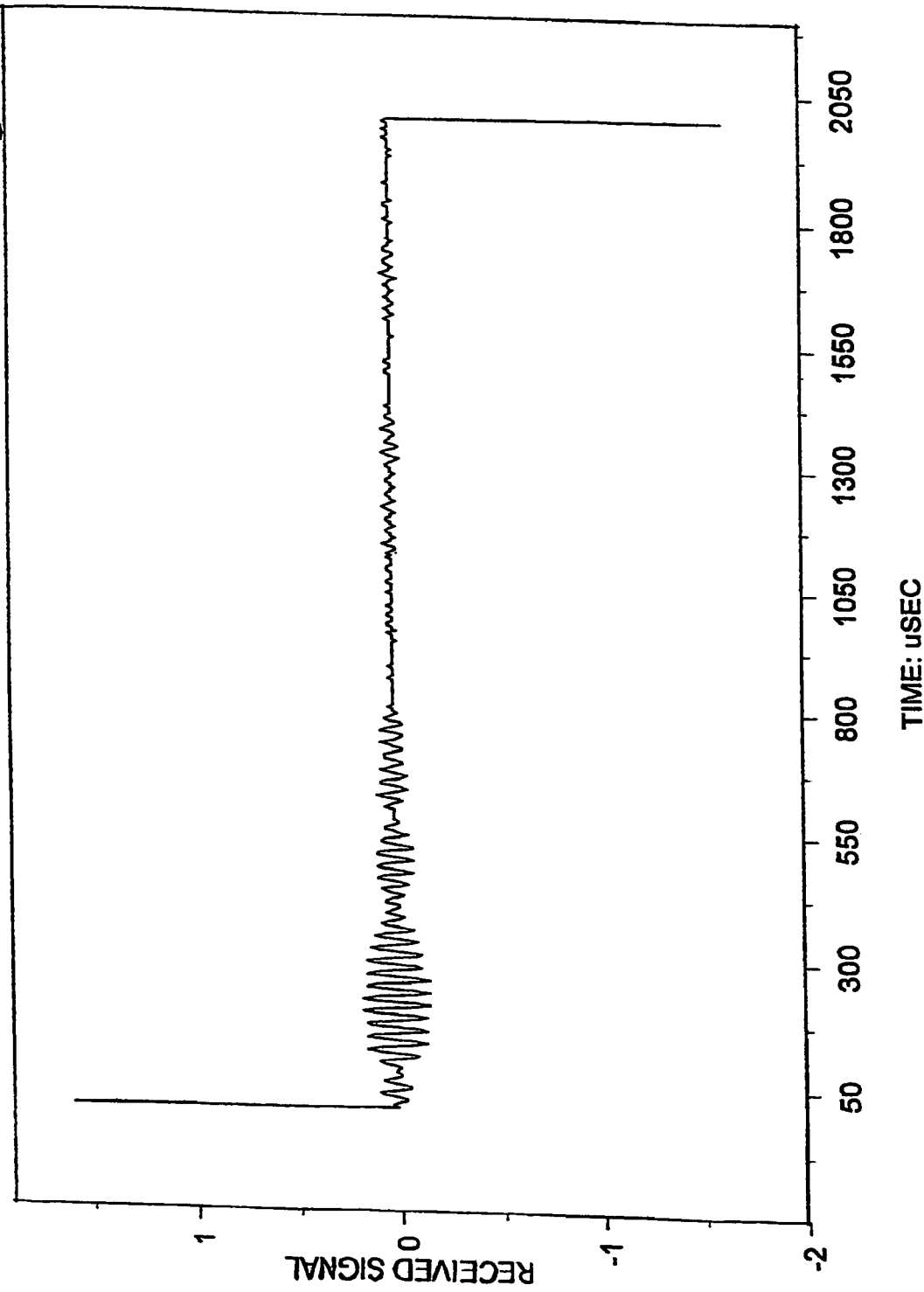
FIGS. 8 & 10 are graphs showing the substantial elimination of cross-talk on an ultrasonic signal received in a geometrically symmetrical planar array of transmitters and receiver, and in which the transmitters are pulse driven in anti-phase.

In comparison with FIG. 7, FIG. 8 shows the effect of cross-talk cancellation when two transmitters are in anti-phase. The small residual cross-talk signal is insignificant (as shown in FIGS. 9 & 10).

Figure 9:
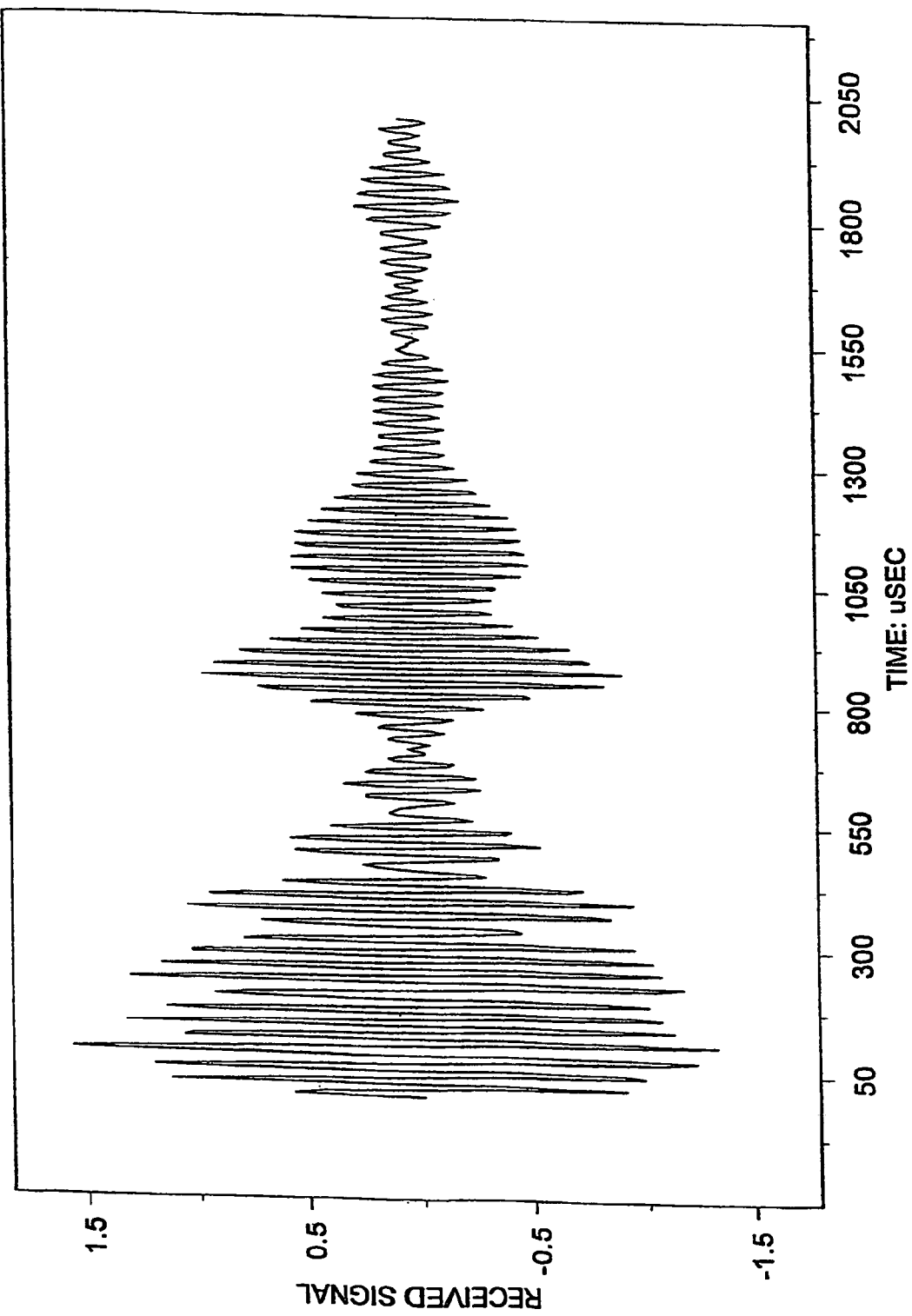

FIG. 9 shows how the received echo signal at 800 microseconds is swamped by the cross-talk signal when the two transmitters are in phase.

Figure 10:
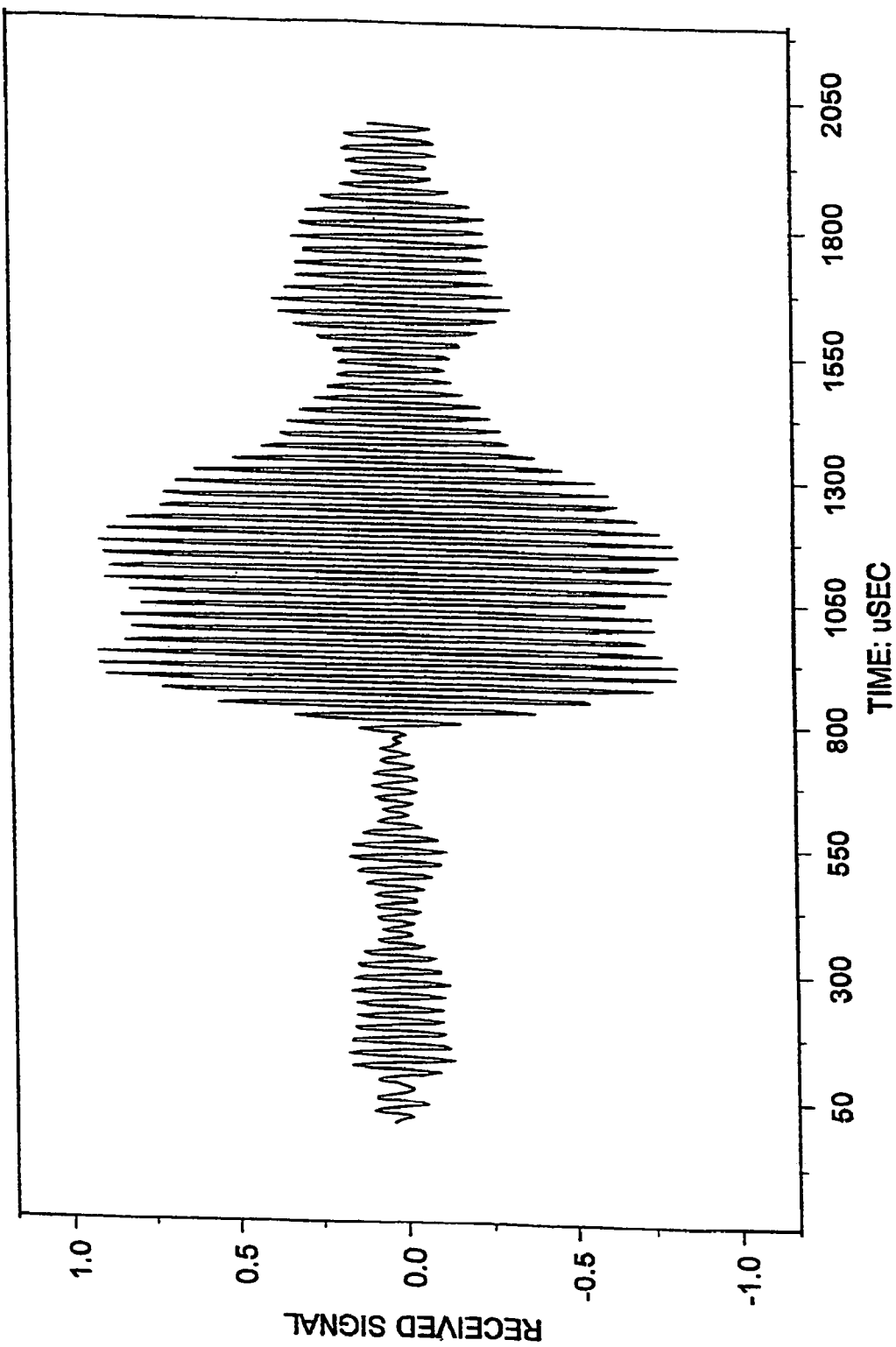

FIG. 10 shows the effect of cross-talk cancellation when the two transmitters are in anti-phase, with the received echo signal at 800 microseconds considerably overwhelming the residual cross-talk signal. In practice, this reduces the dead band to approximately 25 mm.

Various modifications may be made in details of design and construction of the ultrasonic distance measuring systems described above without departing from the scope or ambit of the invention.

One such modification employs an inherent property of a number of transmitters simultaneously transmitting at the same frequency to form a "virtual transmitter". A combined beam is formed to transmit at an angle which depends upon the phase relationship between the signals driving the said transmitters. This is commonly known as "beam steering" in complex ultrasonic phased arrays.

In the example described herein, this effect is employed to take advantage of the anti-phase relationship between two transmitters in an acoustically symmetrical system.

FIG. 11 shows a downward facing ultrasonic distance measuring device installed in a sewer pipe as a depth sensor which normally operates safely above the liquid stream.

Under surge conditions the stream rises and floods the device, and fast moving floating debris can impact upon the active surfaces of the transmitting and receiving transducers of the device.

The angled beam of the "virtual transmitter" is adjusted to the desired vertical orientation by tilting the active surfaces of the device, which then allows a protective raised angled deflector to be formed. In fast flowing conditions of the stream, such a deflector deflects the floating debris away from the transducers to provide an extra degree of protection therefor.

I claim:

1. A system for measuring distance in a gas or liquid operating medium, comprising: an even number of ultrasonic transmitters, and a single ultrasonic signal receiver, wherein the transmitters are electro-acoustic transmitting piezoelectric transducers and the receiver is an electro-acoustic receiving piezoelectric transducer; the ultrasonic signal transmitters being adapted to transmit ultrasonic signals to a target in the operating medium, each transmitter being driven by a separate pulse source so that the total ultrasonic signal transmitted into the gas or liquid operating medium is a combination of positive and negative signals which form an overall transmitted signal, wherein each of the transmitters and receiver are so spaced apart in a geometrically symmetrical planar array within an acoustically attenuating substrate medium and wherein each of the transmitted ultrasonic signals are so pulse driven in an acoustically symmetrical relationship that opposing ultrasonic positive and negative signals transmitted through the substrate medium by symmetrically opposed transmitters are cancelled at the receiver, and a signal for measuring distance to the target is formed at the receiver by combination of the transmitted signals through the operating medium.

2. The system of claim 1 wherein the number of ultrasonic signal transmitters is two.

3. The system of claim 2 wherein a short duration input pulse feeds two power amplifiers, one of said amplifiers inverting an output signal to provide opposing positive and negative signals for driving a respective transmitter.

4. The system of claim 1 wherein the number of ultrasonic signal transmitters is four.

* * * * *